(12) United States Patent
Kouda

(10) Patent No.: US 12,077,917 B2
(45) Date of Patent: Sep. 3, 2024

(54) ABSORBENT SHEET, ABSORBENT SHEET ROLL AND OIL ABSORPTION METHOD

(71) Applicant: Yasuo Kouda, Fukuoka (JP)

(72) Inventor: Yasuo Kouda, Fukuoka (JP)

(\*) Notice: Subject to any disclaimer, the term of this patent is extended or adjusted under 35 U.S.C. 154(b) by 440 days.

(21) Appl. No.: 17/281,138

(22) PCT Filed: Nov. 19, 2020

(86) PCT No.: PCT/JP2020/043257
§ 371 (c)(1),
(2) Date: Mar. 29, 2021

(87) PCT Pub. No.: WO2021/100821
PCT Pub. Date: May 27, 2021

(65) Prior Publication Data
US 2022/0007892 A1    Jan. 13, 2022

(30) Foreign Application Priority Data

Nov. 21, 2019  (JP) .................................. 2019-210794

(51) Int. Cl.
*D21H 27/00* (2006.01)
*A23L 5/20* (2016.01)

(52) U.S. Cl.
CPC ............ *D21H 27/002* (2013.01); *A23L 5/273* (2016.08)

(58) Field of Classification Search
CPC .... D21H 27/002; D21H 27/005; D21H 27/30; A23L 5/00; B65D 81/26; B65D 85/50; A47J 43/28; A47J 37/00; B32B 3/00; B32B 3/26; B32B 3/266; B32B 3/30; B32B 5/02

USPC .......................................................... 162/120
See application file for complete search history.

(56) References Cited

U.S. PATENT DOCUMENTS

| 5,536,264 A | 7/1996 | Van Den Bergh et al. |
| 2014/0134374 A1 | 5/2014 | Chu et al. |
| 2014/0295134 A1* | 10/2014 | Wood ...................... B32B 3/266 428/137 |

(Continued)

FOREIGN PATENT DOCUMENTS

| CA | 3114821 A1 * | 5/2021 | ............. A23L 5/273 |
| CN | 106470655 | 3/2017 | |

(Continued)

OTHER PUBLICATIONS

Kouda Yasuo; Office Action for Chinese patent application No. 202080005288.5, mailed Mar. 21, 2022, 11 pgs.

(Continued)

*Primary Examiner* — Jose A Fortuna
(74) *Attorney, Agent, or Firm* — Taylor English Duma LLP

(57) ABSTRACT

An absorbent sheet can include a sheet portion defining a plurality of first cuts; a plurality of second cuts intersecting the first cuts; an edge portion provided near an edge of the sheet portion in which the first cuts are not provided; and a reed shape portion having a plurality of loose end aggregation portions; wherein the plurality of loose end aggregation portions are connected at a plurality of the edge portions which face each other across the reed shape portion; wherein the plurality of the second cuts are provided between the first cuts; and wherein a plurality of loose ends are formed by connection of a plurality of the second cuts with a line segment portion between two edge points of the first cut.

8 Claims, 19 Drawing Sheets

(56) References Cited

U.S. PATENT DOCUMENTS

2017/0037579 A1    2/2017  Marietta-Tondin et al.
2022/0007892 A1 *  1/2022  Kouda ................ D21H 27/002

FOREIGN PATENT DOCUMENTS

| EP | 0724419 | | 5/2006 | | |
|---|---|---|---|---|---|
| EP | 1056421 | | 7/2006 | | |
| EP | 2975178 | A1 * | 1/2016 | ............. | A47K 10/16 |
| EP | 3851000 | A1 * | 7/2021 | ............. | A23L 5/273 |
| JP | H08480 | A | 1/1996 | | |
| JP | H09504471 | A | 5/1997 | | |
| JP | 2002355211 | A | 12/2002 | | |
| JP | 2008073187 | A | 4/2008 | | |
| JP | 3163077 | U | 9/2010 | | |
| JP | 2011030718 | A * | 2/2011 | | |
| JP | 2013107695 | A | 6/2013 | | |
| JP | 2016521218 | A * | 7/2016 | ............... | B32B 5/18 |
| TW | 200500517 | | 1/2005 | | |
| WO | 1995010995 | | 4/1995 | | |
| WO | 2014165495 | | 10/2014 | | |

OTHER PUBLICATIONS

Kouda, Yasuo, Extended European Search Report for application No. 20864264.5, mailed Jun. 21, 2022, 5 pgs.
Kouda, Yasuo; International Search Report and Written Opinion for PCT/JP2020/043257, filed Nov. 19, 2020, mailed Dec. 28, 2020, 19 pgs.
Kouda, Yasuo; Office Action for India patent application No. 202147011232, filed Mar. 16, 2021, mailed Jun. 30, 2022, 5 pgs.

* cited by examiner

Fig.3

| Content | | State of fried chicken five pieces of chicken with oil | Five pieces of fried chicken are placed on three kinds of oil absorbent paper for five minutes | State of paper from which oil sucked from fried chicken |
|---|---|---|---|---|
| A | Oil absorbent paper of this embodiment (Three-dimensional processing) ※10 sheets | (a) | (d) | (g) |
| B | Oil absorbent paper of this embodiment (Flat placement) ※10 sheets | (b) | (e) | (h) |
| C | Kitchen paper (Flat placement) ※6 sheets | (c) | (f) | (i) |

Fig.4

| Object | Total weight before absorbing oil (g) | | | Overall weight after oil is absorbed (g) | Weight except fried object(g) | Weight of oil absorbed by paper(g) | Comparison |
|---|---|---|---|---|---|---|---|
| Eraser piece | Paper tray | 6.0 | | | 27.5 | | |
| | Kitchen paper(Flat placement) | 21.1 | 87.7 | 122.5 | | 0.4 | |
| | Eraser piece × 4 pieces | 60.6 | | | | | |
| | Paper tray | 5.6 | | | 28.5 | | 375% |
| | Oil absorbent paper (Three-dimensional processed) | 21.4 | 87.6 | 118.2 | | 1.5 | |
| | Eraser piece × 4 pieces | 60.6 | | | | | |
| Baumkuchen | Paper tray | 6.0 | | | 29.0 | | |
| | Kitchen paper(Flat placement) | 20.9 | 134.7 | 193.7 | | 2.1 | |
| | Baumkuchen × 4 pieces | 107.8 | | | | | |
| | Paper tray | 6.2 | | | 29.1 | | 81% |
| | Oil absorbent paper (Three-dimensional processed) | 21.2 | 133.9 | 184.1 | | 1.7 | |
| | Baumkuchen × 4 pieces | 106.5 | | | | | |
| Quail eggs | Paper tray | 5.9 | | | 27.1 | | |
| | Kitchen paper(Flat placement) | 20.7 | 139.3 | 151.2 | | 0.5 | |
| | Quail eggs × 12 pieces | 112.7 | | | | | |
| | Paper tray | 5.9 | | | 28.8 | | 440% |
| | Oil absorbent paper (Three-dimensional processed) | 20.7 | 130.5 | 144.0 | | 2.2 | |
| | Quail eggs × 12 pieces | 103.9 | | | | | |

1mm

3mm

10mm

20mm

30mm

50mm

70mm

90mm

100mm

1mm

3mm

10mm

20mm

30mm

50mm

70mm

90mm

100mm

ABSORBENT SHEET, ABSORBENT SHEET ROLL AND OIL ABSORPTION METHOD

TECHNICAL FIELD

The present invention relates to an absorbent sheet, an absorbent sheet roll, and an oil absorption method, and more particularly to an absorption sheet or the like for removing droplets or liquid films attached to the surface of an object.

BACKGROUND ART

As the health-oriented increases, a laying plate or the like for reducing the oil content of deep-fried food such as fried chicken for a consumer has been developed.

For example, Patent Document 1 discloses a paper-made laying plate for fried food such as port cutlet, menchi katsu, croquette, fried chicken, tempura, french-fried potato, and the like, which makes the oil-cutting of fried food easier (Patent Document 1). In addition, it has been proposed to place a plurality of kitchen paper under a parchment paper with a cut to wrap meat and fish (Patent Document 2).

PRIOR ART LITERATURE

Patent Document

Patent Document 1: Japanese Patent Application Laid-Open No. 2013-107695
Patent Document 2: Japanese Utility Model Registration 3163077

SUMMARY OF THE INVENTION

Problem Solved by the Invention

However, the laying plate disclosed in Patent Document 1 is used to prevent the cut oil from adhering again to the fried food. This method is an inactive (i.e., passive) oil draining method in a sense that the oil is left to fall naturally.

In addition, the technique described in Patent Document 2 discloses the method in which meat and fish are wrapped by the parchment paper which "does not pass water and oil" (paragraph 0006) and the oil adhered to the meat and fish is absorbed by the kitchen paper via the cut of the parchment paper. This method is also inactive as the method disclosed in Patent Document 1.

It is therefore an object of the present invention to provide an absorbent sheet which is capable of positively removing droplets attached to the surface of an object more positively than a conventional technique used for oil cutting, and which can be used for foods.

Means for Solving the Problem

A first aspect of the present invention is an absorbent sheet for removing a droplet or a liquid film attached to a surface of an object, comprising a sheet portion in sheet form, a plurality of first cuts provided in the sheet portion, a plurality of second cuts shorter than the first cuts provided in a direction intersecting the first cuts, an edge portion provided near an edge of the sheet portion, in which the first cuts are not provided, and a reed shape portion having a plurality of loose end aggregation portions, the portion which is an area sandwiched between a couple of the first cuts in line segment-like cut in a direction normal toward the edge portion, leaving the edge portion uncut, wherein the plurality of loose end aggregation portions are connected at a plurality of the edge portions which face each other across the reed shape portion, wherein the plurality of the second cuts are provided between the first cuts, and wherein a plurality of loose ends are formed by connection of a plurality of the second cuts with a line segment portion between two edge points of the first cut.

A second aspect of the present invention is the absorbent sheet according to the first aspect, wherein the plurality of the second cuts are arranged in a staggered manner, so that the sheet portion spreads in a net-shape when the sheet portion is pulled in a direction perpendicular to the second cuts.

A third aspect of the present invention is the absorbent sheet according to the second aspect, wherein the plurality of the second cuts reach a side of the sheet portion in a direction intersecting the second cuts.

A fourth aspect of the present invention is the absorbent sheet according to any one of the first through the third aspects, further comprising a third cut provided in the edge portion in a direction intersecting the first cuts.

A fifth aspect of the present invention is the absorbent sheet according to any one of the first through the fourth aspects, wherein the sheet portion has a plurality of sheets, that is, a first sheet and a second sheet with more rigidity than that of the first sheet, wherein the first sheet has higher absorbency than the second sheet, wherein at least a portion of the first cuts or the second cuts penetrate the first sheet and the second sheet.

A sixth aspect of the present invention is the absorbent sheet according to the fifth aspect, wherein a plurality of the first sheets are stacked so as to sandwich the second sheet.

A seventh aspect of the present invention is the absorbent sheet according to any one of the first trough the sixth aspects, wherein a shape of the sheet portion is square, rectangular, trapezoidal, parallelogram, or other polygonal shape, or circular or elliptical shape.

A seventh aspect of the present invention is an absorbent sheet roll in which a plurality of absorbent sheets in the first through the sixth aspects are connected by a cutting line.

An eighth aspect of the present invention is an oil absorption method for absorbing an oil droplet or an oil film attached to a surface of a deep-fried food, including, a three-dimensional configuration step of grabbing the absorbent sheet, according to any one of the first through the sixth aspects, to make the absorbent sheet into a three-dimensional form with at least a portion of the second cuts is hooked to another part of the sheet portion, and a placing step of placing a deep-fried food on the absorbent sheet in the three-dimensional form made in the three-dimensional configuration step.

A ninth aspect of the present invention is the oil absorption method according to the eighth aspect, further including, before the three-dimensional configuration step, a net-shape making step of pulling the sheet portion of the absorbent sheet, according to any one of the third through the sixth aspects, in a direction perpendicular the second cuts to spread the sheet portion into a net-shape.

A tenth aspect of the present invention is the absorbent sheet that removes droplets and liquid films attached to the surface of an object, and is provided with a sheet part that is a sheet-like form and a plurality of cuts.

An eleventh aspect of the present invention is the absorbent sheet according to the tenth aspect, further comprising an edge portion that does not have the cut around at least a portion of the edge of the sheet portion.

A twelfth aspect of the present invention is the absorbent sheet according to the eleventh aspect, wherein whole the sheet portion is connected in spite of all the cuts.

A thirteenth aspect of the present invention is the absorbent sheet according to the twelfth aspect, wherein the shape of the absorbent sheet is rectangular or square shape, wherein the edges provided near all four sides, and a plurality of the cuts are arranged in a region surrounded by the edge.

A fourteenth aspect of the present invention is the absorption sheet according to the thirteenth aspect, wherein the gap between adjacent cuts is at least 2 mm at the narrowest point, and is not more than 9 cm at the widest point.

A fifteenth aspect of the present invention is the absorption sheet according to the thirteenth or fourteenth aspect, wherein the edge is a length of 33% or less with respect to a length of one side.

A sixteenth aspect of the present invention is the absorption sheet according to the twelfth aspect, wherein the shape of the absorbent sheet is rectangular or square shape, and at least one side of two opposing sides is the edge not having the cut, and the other one side has a cut to the edge.

A seventeenth aspect of the present invention is an absorbent sheet roll in which a plurality of absorption sheets according to the tenth through sixteenth aspect are connected by a cutting line.

An eighteenth aspect of the present invention is the absorbent sheet roll according to the seventeenth aspect, wherein the cutting line is formed linearly in a direction intersecting the cutting line.

A nineteenth aspect of the present invention is the absorbent sheet of any of the tenth to twelfth and sixteenth aspects is connected by a cutting line, and the cut line is an absorption sheet roll extending to the cutting line.

A twentieth aspect of the present invention is an absorbent sheet for removing droplets or liquid films attached to the surface of an object, comprising a sheet portion that is in a sheet-like form, a sheet portion that is in a sheet-like form, a plurality of first cuts provided in the sheet portion, a plurality of second cuts shorter than the first gap provided in a direction intersecting the first cut, an edge portion in which the first cut is not entered, located at the edge of the sheet portion, and a split portion including a plurality of end collection portions. The end collection portion is a region sandwiched between two lines segment-like first cuts that are provided toward the edge portion, without being provided into the edge portion, in the vertical direction with respect to the edge portion. The plurality of end collection portions are connected at the edge portions existing across the split portion. A plurality of second cuts are provided between a plurality of the first cuts. At least a plurality of second cuts are connected to a line segment portion sandwiched between the end points of a first cut, to form a plurality of strips.

A twenty-first aspect of the present invention is an absorbent sheet (31) for removing droplets or liquid films attached to the surface of an object, comprising a sheet portion (33) which is a sheet-like form having two opposing sides, a plurality of first cuts (35) lines provided in the sheet portion, a plurality of second cuts (41) which are provided in a direction intersecting the first cuts and which are shorter than the first cuts, an end portion (37) in which the first cut and the second cut are not formed, provided on the opposite two sides of the sheet portion, and a split portion (39) including a plurality of strips. The strip is a region sandwiched between two lines segment-like first cuts that are provided toward the edge portion, without being provided into the edge portion, in the vertical direction with respect to the edge portion. The plurality of the strips are connected at the edge portion. A plurality of second cuts are provided between a plurality of the first cuts. At least a plurality of second cuts are connected to a line segment portion sandwiched between the end points (44) of a first cut, to form a plurality of strips (42).

Effect of the Invention

According to each aspect of the present invention, in the case of carrying and setting the absorbent sheet, it is possible to save the place in a planar manner. And in use, by grabbing the absorbent sheet, the reed shape portion is entangled to form a three-dimensionally expanded shape. In addition, the loose ends formed by a plurality of first cuts and a plurality of second cuts are hooked to a part of the sheet part such as a first cut, a side of the sheet part, or another second cut, so that a three-dimensionally expanded shape can be stabilized. As a result, it becomes possible to provide an absorbent sheet in which an object is inserted into a three-dimensionally expanded shape which is hard to collapse, so that a contact area with the absorbent sheet is dramatically increased to positively remove droplets or liquid films attached to the surface of the object.

According to the second aspect of the present invention, it becomes possible to provide an absorbent sheet having a more swollen shape because the reed shape portion is extended by expanding the second cut formed in a staggered manner into a net shape. In addition, it is easier for the second cuts to be entangled with a part of the sheet part to hold the three-dimensionally expanded shape more easily.

According to the third aspect of the present invention, it is possible to more easily expand because of more area to expand, and to easily spread all the second cuts in a net-like manner.

According to the fourth aspect of the present invention, by inserting the edge of the opposite side into the third cut, it is possible to wrap the object like a mat without grabbing or rubbing repeatedly the absorbent sheet. As a result, it is easier to remove droplets or liquid films attached to the surface of the object.

According to the fifth aspect of the present invention, it is possible to provide an absorbent sheet having both high absorbency and high rigidity without using a special sheet having both high absorbency and high rigidity.

According to the sixth aspect of the present invention, it is possible to use an absorbent sheet having both absorbency and high rigidity without being worried about the front and back of the absorbent sheet by the user.

According to the tenth aspect of the present invention, cuts are formed in the absorption sheet, so that it can be easily brought into a three-dimensionally expanded state by being entangled with each other. As a result, the contact between the absorption sheet and the object can be increased to efficiently absorb droplets of the surface of the object. Therefore, it becomes possible to provide an absorbent sheet that achieves both convenience in transportation and storage due to being sheet-like, and high absorption efficiency due to a three-dimensional structure during use.

According to the eleventh aspect of the present invention, at least one side of the absorption sheet is provided with an edge having no cut. Therefore, in the case where the object is a food, it is easy to reduce the risk that the absorbent sheet becomes torn and the torn piece is erroneously eaten together with the object.

Furthermore, according to the twelfth aspect of the present invention, since the entire absorbent sheet is connected as one, it becomes possible to provide an absorbent sheet that achieves both a three-dimensional and high absorption efficiency and a simplicity in disposal.

Further, according to the thirteenth through the sixteenth aspects of the present invention, it becomes possible to provide an absorbent sheet which enables a user to easily and stably obtain a three-dimensional structure by repeatedly grabbing the absorbent sheet.

According to the eighteenth aspect of the present invention, when the user separates and uses the individual absorbent sheets from the absorbent sheet roll, when the cutting line and the cuts are parallel to each other, the breaking force also acts on the cuts of the absorbent sheet. Then, the break of the absorbent sheet may also result in a break of the edge or the like without cuts. Therefore, it is easy to prevent the individual absorbent sheets from being damaged by providing the cuts in the direction crossing the cutting lines.

Further, according to the nineteenth aspect of the present invention, after the individual absorbent sheets are cut off, one end of the cut is up to the edge, so that it is easy to cut off the cut. Therefore, the user can more easily form a three-dimensional shape.

BRIEF DESCRIPTION OF THE DRAWINGS

FIG. 3 shows a result of comparison of three types of oil absorption methods.

FIG. 4 is a diagram showing a result of comparing an oil absorption amount with respect to three kinds of objects in which the standard has been unified.

FORM FOR CARRYING OF THE INVENTION

The embodiments of the present invention will be described below with reference to the drawings. The embodiment of the present invention is not limited to the following examples.

Embodiment 1

Figure 1:
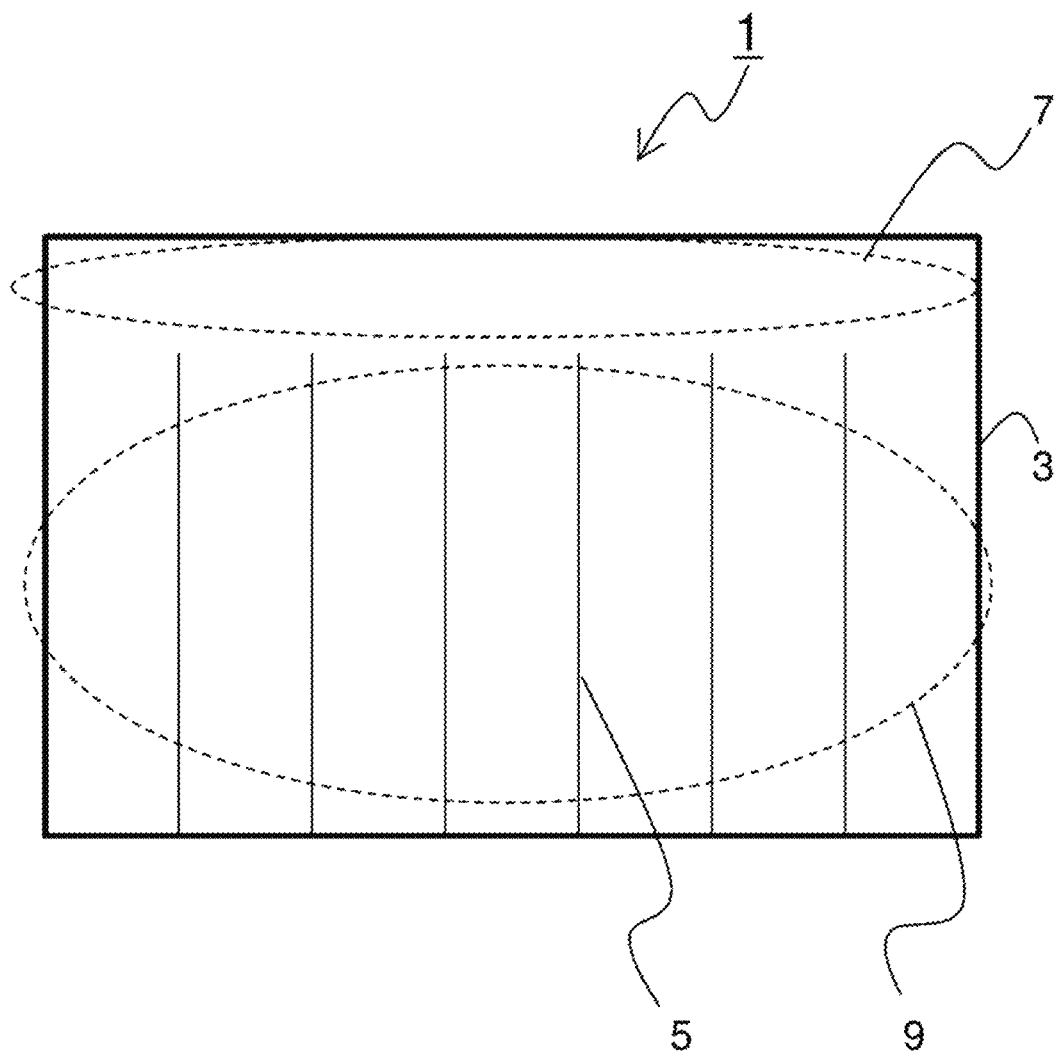
FIG. 1 is a schematic diagram showing an outline of oil absorbent paper of embodiment 1.

FIG. 1 is a schematic diagram showing an outline of an oil absorbent sheet 1 (an example of an "absorbent sheet" according to the present invention) according to the first embodiment of the present invention. The oil absorbent paper 1 sucks oil droplets and oil films attached to the surface of an object such as fried chicken, and is generally the size of a paper towel. The oil-absorbing paper 1 includes a sheet portion 3 (an example of a "sheet portion" of the present application) and a plurality of cuts 5. The sheet portion 3 has an edge portion 7 (an example of the "edge portion" in the present application) and a reed shape portion 9. Specifically, the oil absorbent paper 1 has a plurality of cuts 5 of the same length in the same direction leaving an edge 7 of about 1 cm. As a result, the oil absorbent paper 1 is a strip-like sheet having a width of about 1 cm connected at the edge 7. However, the cut lines 5 before use are connected by perforations.

Figure 2A:
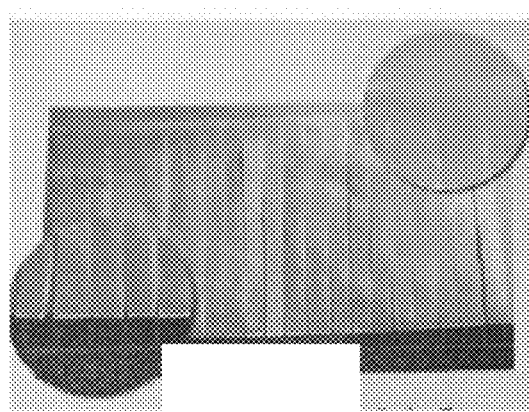
FIG. 2A is a diagram showing a method of using oil absorbent paper.
Figure 2B:
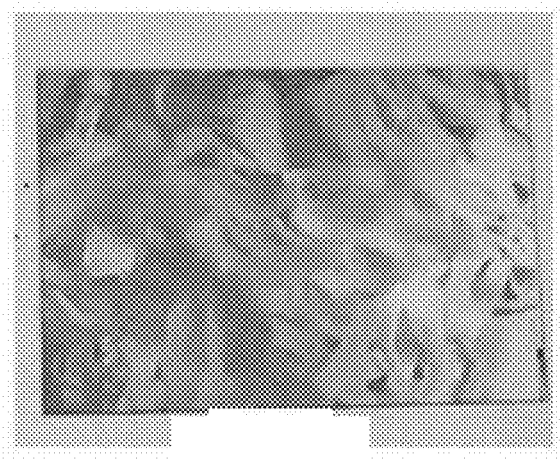
FIG. 2B is a diagram showing a method of using oil absorbent paper.
Figure 2C:
FIG. 2C is a diagram showing a method of using oil absorbent paper.

Referring now to FIG. 2A-2C, a method of using the oil absorbent paper 1 will be described. FIG. 2 is a diagram showing a method of using oil absorbing paper. As shown in FIG. 2A, the user disconnects the cut 5 prior to use of the oil absorbent paper 1. Subsequently, as shown in FIG. 2B, the oil absorbent paper 1 is made to be three-dimensional (hereinafter, referred to as a "three-dimensional configuration step") by grabbing and rubbing the oil-absorbing paper 1 and entwining the reed shape portion 9 made of a plurality of strips. Further, as shown in FIG. 2C, an object 11 such as fried chicken is put in the three-dimensional oil absorbent paper 1 to suck oil droplets or oil films attached to the surface of the object 11.

Referring now to FIG. 3, an experimental method in which the effect of the oil absorbent paper of this embodiment is confirmed will be described. FIG. 3 shows a comparison between three types of oil absorption methods. (1) Five pieces of fried chicken (FIG. 3 (*a*)-(*c*)). (2) Five pieces of fried chicken after 5 minutes left on 3 kinds of absorbent paper (FIG. 3 (*d*)-(*f*)). (3) The 3 kinds of absorbent paper including the absorbed oil after the five pieces of fried chicken are removed (FIG. 3 (*g*)-(*i*)).

Here, the three types of oil absorbent paper were the oil absorbent paper according to the present embodiment to which the three-dimensional process is applied, flat-placed oil absorbent paper, and flat-placed kitchen paper. "Flat-placed" means a planar state without passing through the three-dimensional process (three-dimensional process).

As the measurement, the weight of the oil absorbent paper before the oil is sucked, the weight of the oil absorbent paper after the oil is sucked, and the weight of the fried chicken are measured and recorded. Three types of oil absorption methods are measured for three times, respectively, and the average values thereof were used as the measurement results. The measurement results are shown in Table 1.

TABLE 1

| | Content | Weight of fried chicken (g) | Weight of oil absorbent paper before oil absorption (g) | Weight of oil absorbent paper after oil absorption (g) | Oil Absorption amount (g) | Oil absorption per 1 g of fried chicken (mg) |
|---|---|---|---|---|---|---|
| A | Oil absorbent paper of this embodiment (Three-dimensional processing) ✗10 sheets | 158.3 | 21.6 | 25.0 | 3.4 | 21.5 |
| B | Oil absorbent paper (Flat placement) ✗10 sheets | 174.8 | 22.0 | 23.8 | 1.8 | 10.3 |
| C | Kitchen paper (Flat placement) ✗6 sheets | 164.7 | 10.7 | 12.1 | 1.4 | 8.5 |

As shown in Table 1, by applying a three-dimensional process to the oil absorbent paper, oil absorption of more than twice as compared with the case of flat placement becomes possible. It may be because of increased contact with the object, such as fried chicken, because the oil absorbing paper is three-dimensional resulting in the increased number of capillary action.

In addition, by having cuts in the oil absorbent paper, the degree of freedom in the three-dimensional coordination of the oil absorbent paper is increased, thereby increasing the spatial extent of expansion of the oil absorbent paper. As a result, it is considered that the object such as fried chicken is more easily buried in the oil absorbent paper, and the contact with the oil absorbent paper is increased.

The oil absorbent paper may be used to absorb water droplets of an object such as a fruit, or the like, other than oil absorption of frying oil. In addition, the absorbent paper may be used as an absorbent sheet for removing a droplet or a liquid film attached to the surface of the object.

Since the sizes and shapes of the fried chickens are different from each other, the variation of the data is considered to be large. Therefore, an experimental method in which the effect of the oil absorbent paper of the present embodiment is confirmed by the object having a standard shape is described. As the measurement contents, the total weight before the oil is sucked, the total weight after the oil is sucked, the weight excluding the fried object were measured and recorded. Further, in three kinds of objects, the weight of oil sucked by the oil absorbent paper is calculated, and the result of the comparison is shown in FIG. 4.

As shown in FIG. 4, an object having a shape similar to a three-dimensional sphere such as an "eraser piece" and a "quail egg" has been subjected to a three-dimensional process to the oil absorbent paper, thereby making it possible to absorb oil four times or so as much as compared with the case of flat placement. However, Baumkuchen resulted in more oil absorption by flat oil-absorbing paper. This is thought to be due to the large contact area of the flat part. In the general shape, it is not always necessary to have a large flat part to contact a plate, and therefore, the experimental results of the "eraser piece" and the "quail egg" are considered to be more realistic.

Figure 5A:
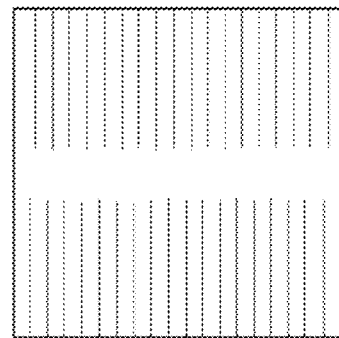
FIG. 5A shows three cuts used in the experiment.
Figure 5B:
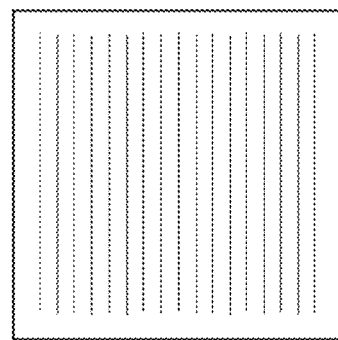
FIG. 5B shows three cuts used in the experiment.
Figure 5C:
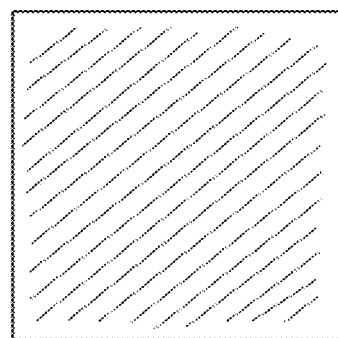
FIG. 5C shows three cuts used in the experiment.

Next, an experimental method for confirming the effect of cut patterns which makes possible to form an absorbent sheet effectively into a three-dimensional shape when the oil absorbent paper is grabbed and rubbed is described. As shown in FIGS. 5A-5C, the oil absorbent paper having cuts as shown in FIGS. 5A-5C were grabbed and rubbed repeatedly for 20 seconds, and the spreading and height of the resulted oil absorbent paper were compared with each other. By the way, the rear drawings (bottom view) of the cut patterns to the oil absorbent paper shown in FIG. 5 are symmetric with the table drawing (plan view) and not shown.

Figure 6:
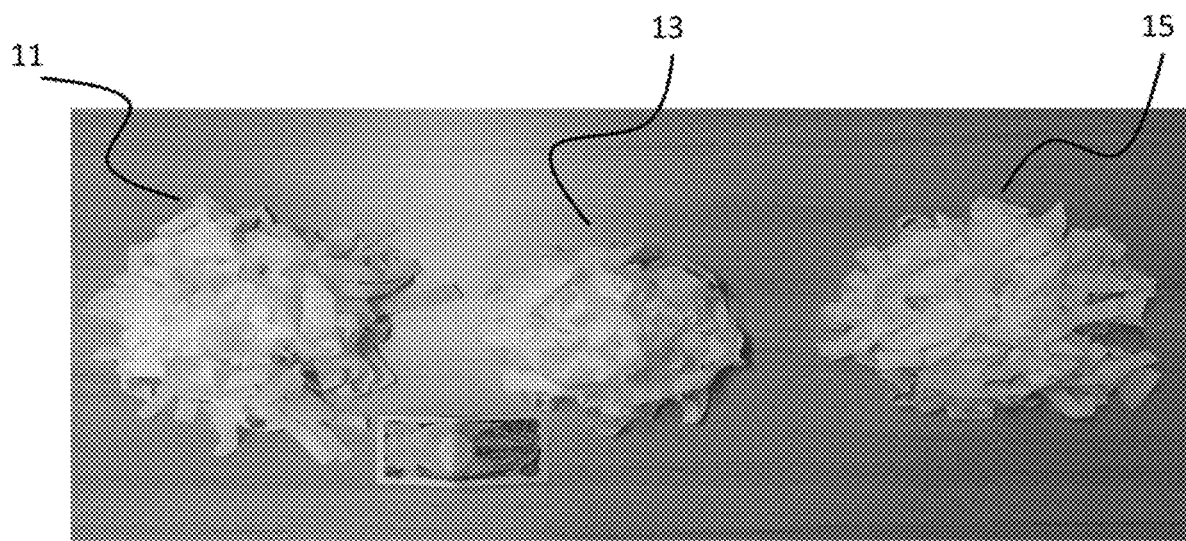
FIG. 6 is a diagram showing a result of comparison of the spread of the oil absorbent paper which is grabbed and rubbed into the three-dimensional shape.

FIG. 6 shows a result of the comparison of the spread of the oil absorbent paper which is rubbed into the three-dimensional shape. As shown in FIG. 6, when the three-dimensional shape of FIG. 5A is viewed from the upper part, the three-dimensional shape of FIG. 5A is viewed from the upper part. The state (15) when the three-dimensional shape of FIG. 5A is viewed from the upper part is hardly entangled with each other. However, when the three-dimensional shape of FIG. 5B is viewed from the upper part, it can be seen that the oil-absorbing paper is entangled with each other.

Figure 7:
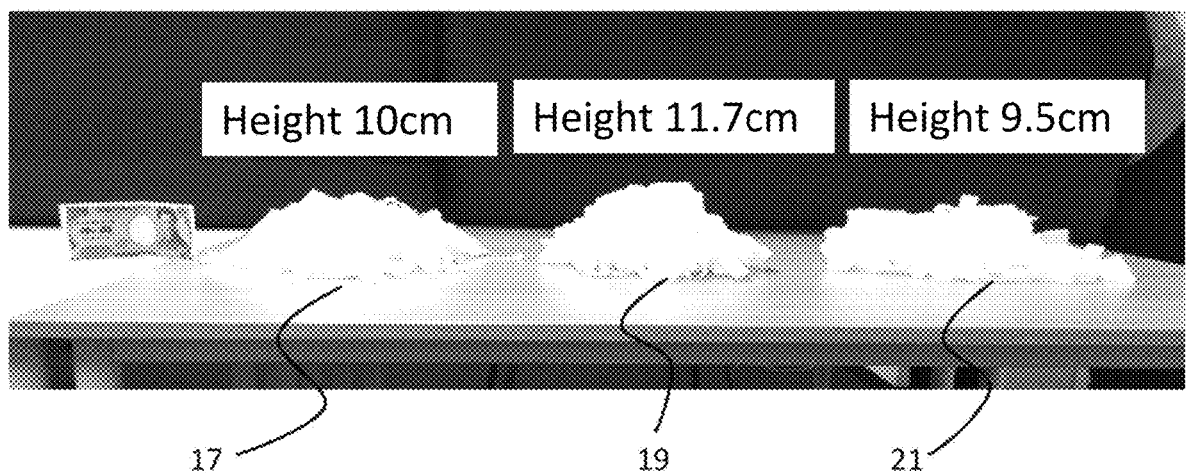
FIG. 7 is a diagram showing a result of comparing the height of the oil absorbent paper which is grabbed and rubbed into the three-dimensional shape.
Figure 8A:
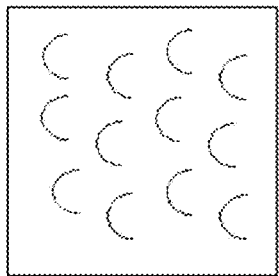
FIG. 8A-8I are the diagrams showing various examples of the cuts of the oil absorbent paper.
Figure 8E:
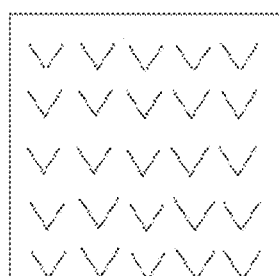
Figure 8I:
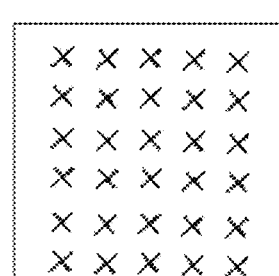
Figure 8B:
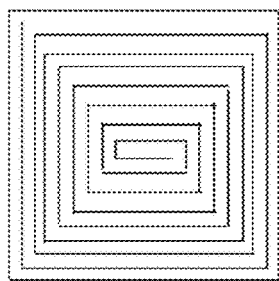
Figure 8F:
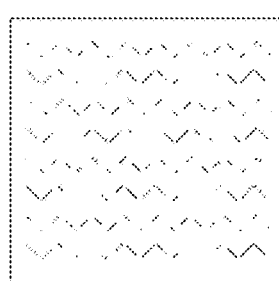
Figure 8C:
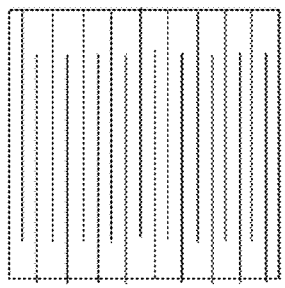
Figure 8G:
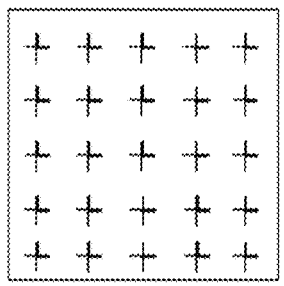
Figure 8D:
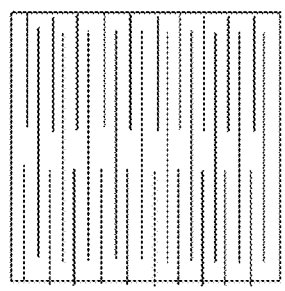
Figure 8H:
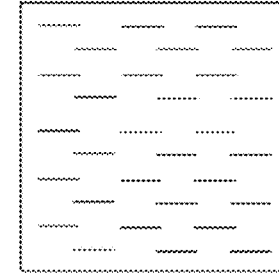

FIG. 7 shows a result of comparing the height of the oil absorbent paper that has been rubbed into the three-dimensional shape. As shown in FIG. 7, while the three-dimensional shape of FIG. 5A is viewed from the side, the three-dimensional shape of FIG. 5A and FIG. 5C are viewed from the side, although the three-dimensional shape is formed, the height and density are relatively low. In comparison with that, the three-dimensional shape 19 of FIG. 5B seen from the side is more condensed, and therefore, the height is also increased and the density is also increased.

For the reasons described above, it can be seen that the cut pattern of FIG. 5B can form a three-dimensional shape which is not flatter than the cut pattern of FIG. 5A or FIG. 5C and which is hard to be loosened.

Further, the cut pattern to the oil absorbent paper may be shaped as shown in FIG. 8A-8I. Also, the rear drawing (bottom view) of the cut pattern to the oil absorbent paper shown in FIG. 8A-8I are symmetric with the table drawings (plan view) and not shown.

Next, with reference to FIG. 9A-9I, the results of consideration of the pitch of the cuts will be described. FIG. 9A-9I are the diagrams showing the relationship between the pitch of the cuts to the oil absorbent paper and the entanglement degree of the oil absorbent paper. The edges of the oil absorbent paper were unified to 1 cm.

Figure 9A:
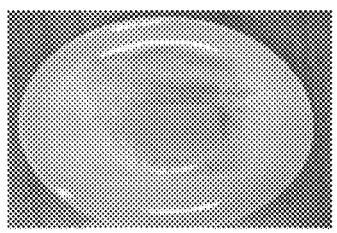
FIG. 9A-9I are the diagrams showing the relationship between the pitch of the cuts of the oil absorbent paper and the entanglement degree of the oil absorbent paper.
Figure 9B:
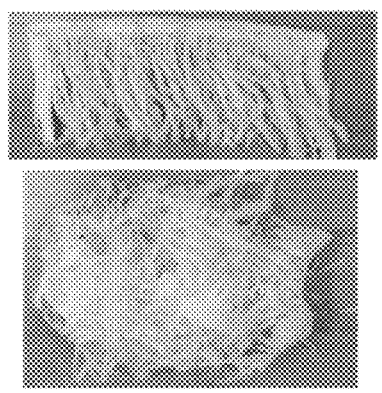
Figure 9C:
Figure 9D:
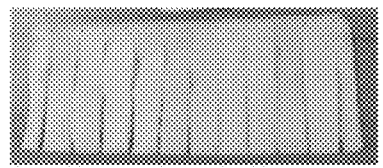
Figure 9E:
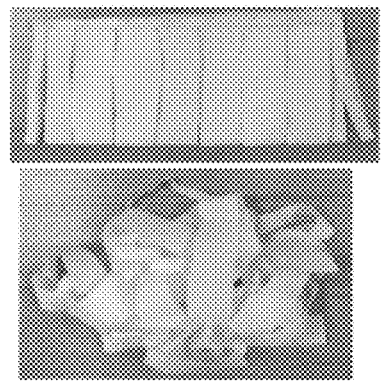
Figure 9F:
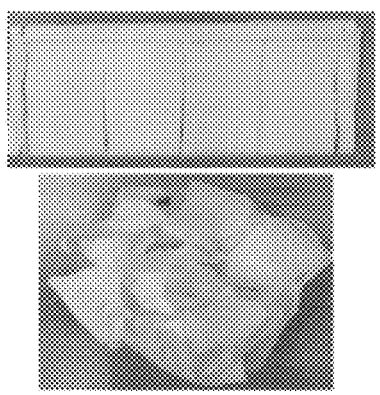
Figure 9G:
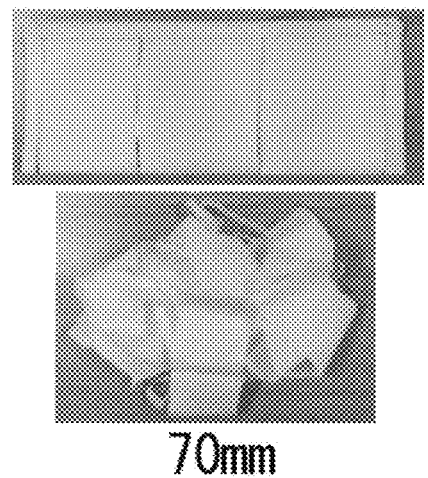
Figure 9H:
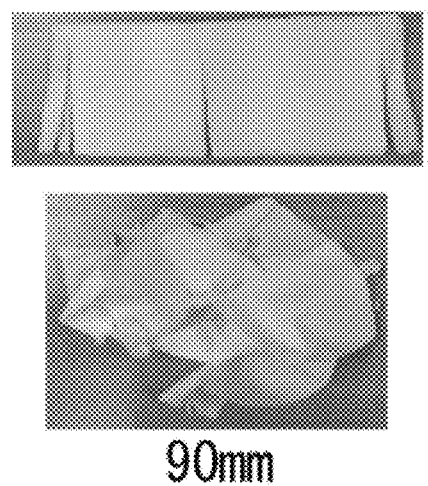
Figure 9I:
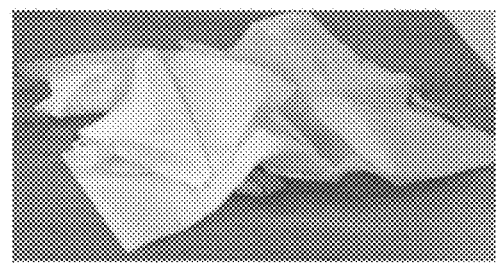

As shown in FIG. 9A, when the pitch is set to 1 mm, the oil absorbent paper was not efficient as expected because the oil absorbent paper was not sufficiently inflated, so that the object is not sunk in the oil absorbent paper. Additionally, the oil absorbent paper was broken when the oil adheres to the oil absorbent paper. On the other hand, up to 2 mm to 9 cm, the oil absorbing paper exhibited a proper three-dimensional bulge. Therefore, it has been found from the present experiment that the pitch of the cuts is preferably 2 mm or more and 9 cm or less.

Further, with reference to FIG. 10A-10I, a discussion of the edge width will be described. FIG. 10A-10I are the diagrams showing the relationship between the width of the edge of the oil absorbent paper and the entanglement degree of the oil absorbent paper. The pitch of the cuts of the oil absorbent paper was unified to 1 cm.

Figure 10A:
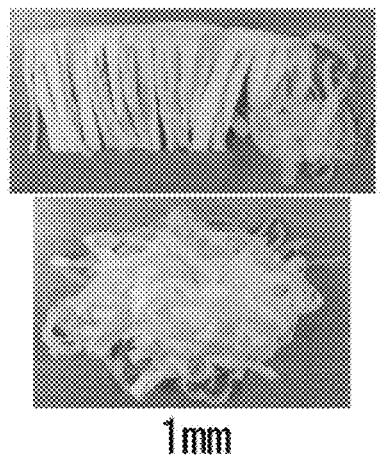
FIG. 10A-10I are the diagrams showing the relationship between the width of the edge of the cut edge of the oil absorbent paper and the entanglement degree of the oil absorbent paper.
Figure 10B:
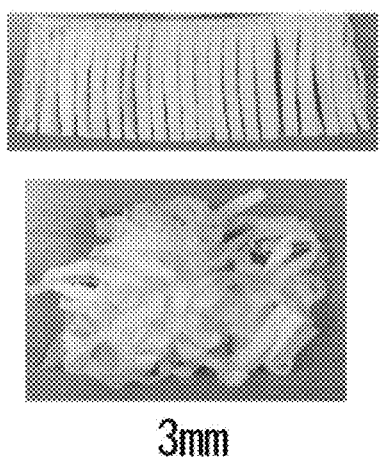
Figure 10C:
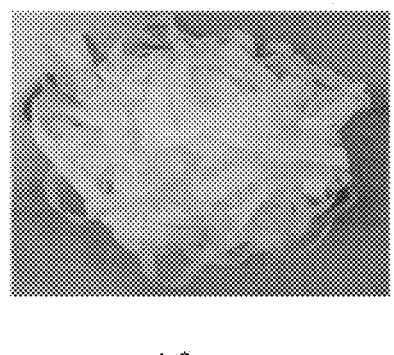
Figure 10D:
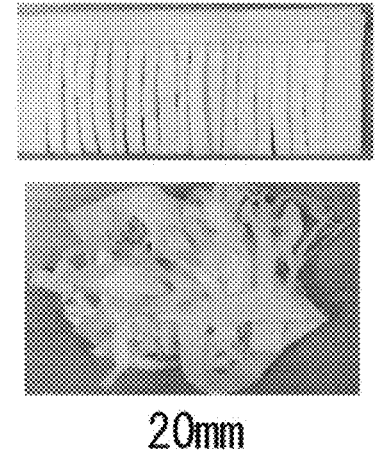
Figure 10E:
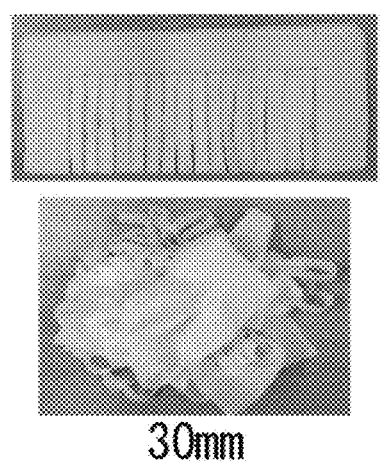
Figure 10F:
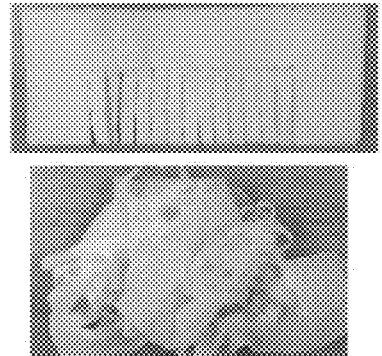
Figure 10G:
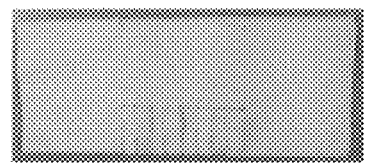
Figure 10H:
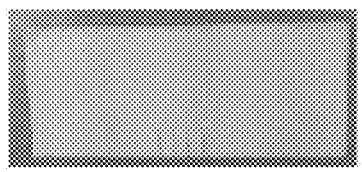
Figure 10I:
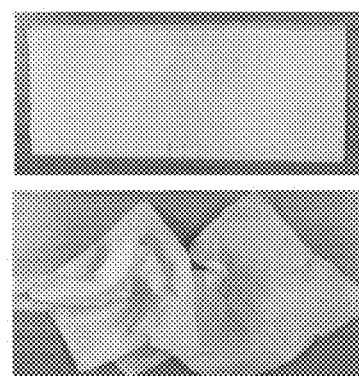

As shown in FIG. 10H, when the edge width was as large as 41.9% of one side (about 21.5 cm), because the number of cuts were decreased and the lengths of the cuts were shortened, the oil absorbent sheets were not fully inflated three-dimensionally without tangling. On the other hand, when the width of the edge is 0.5 to 33% of one side, the oil absorbent paper is entangled with each other to gain a three-dimensional bulge.

In FIGS. 9A-9I and FIGS. 10A-10I, the absorbent sheets are square-shaped and all four edges of the oil absorbent paper are left. However, the shape of the oil absorbent paper may be rectangular and only 1-3 sides may be left.

The size of the oil absorbent paper may be standard size as commercially available general kitchen paper (horizontal 220 mm×vertical 230 mm) or may be other size.

The shape of the oil absorbent paper is not limited to square or rectangular, but may be circular, trapezoidal, parallelogram, or polygonal.

The oil absorbent paper may be an absorber other than paper. In view of the convenience of transportation, it is preferable to be in sheet shape with cuts so that strips can be easily entangled resulting in a three-dimensional shape.

In addition, the cut of the oil absorbent paper may be in different directions or different lengths.

In addition, the cuts of the oil absorbent paper is not limited to those to make a strip-shaped portion, but may be other cuts. It is preferable that the sheet parts are not separated even after the cut lines are cut off, it is easier to dispose the oil absorbent paper after use.

In addition, the oil absorbent sheet of the present embodiment may be provided as an oil absorbent sheet roll (one example of the "absorbent sheet roll" of the present application) connected by a cutting line. In addition, a plurality of oil absorbent sheets may be stored in one box without being connected like a general tissue paper.

Embodiment 2

Figure 11:
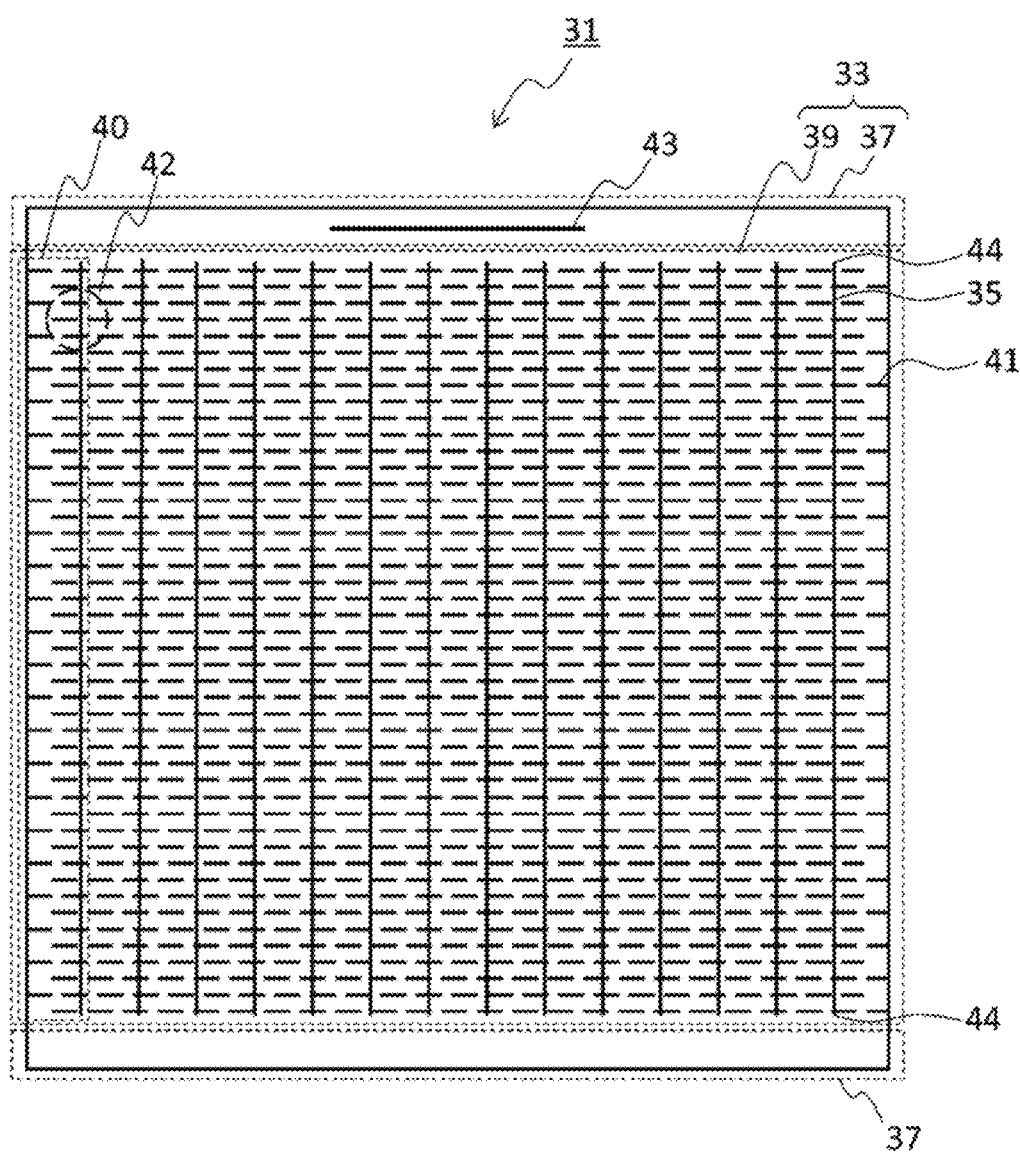
FIG. 11 is a schematic diagram showing an outline of the oil absorbent paper of embodiment 2.

FIG. 11 is a schematic diagram showing an outline of an oil absorbent sheet 31 (an example of an "absorbent sheet" according to the present invention) according to the second embodiment of the present invention. The oil absorbent paper 31 is provided with a sheet portion 33 (an example of a "sheet portion" in the present application) as in embodiment 1 and a first cut 35 (an example of a "first cut" of the claim of the present application) corresponding to the cut 5 of Embodiment 1. As in Embodiment 1, the sheet portion 33 has an edge portion 37 (an example of the "edge portion" of the present application) and a reed shape portion 39. The reed shape portion 39 is composed of a plurality of areas, each of which is referred as an end collection portions 40. The end collection portion 40 is a region sandwiched between two lines segment-like first cuts 35 that are provided in the vertical direction with respect to the two sides of the edge 37, without being provided in the edge 37. The plurality of edge collection portions 40 are connected by edge portions 37 that are present across the reed shape portion 39.

The oil absorbent paper 31 further includes a second cut 41 (one example of the "second cut" of the claim of the present application) shorter than the first cut 35, and a third cut 43 (an example of the "third cut" of the claim of the present application). Specifically, the oil absorbent paper 31 is square, and a plurality of first cuts 35 having the same length in the vertical direction with respect to two sides of the edge 37 are provided, leaving edges 37 of about 1 cm in two opposite sides of the oil absorbent paper 31. At least a part of the plurality of second cuts 41 is provided between the first cuts 35, and is connected to the first cut, and is provided normal to the first cut 35 in a staggered manner. Further, at least a part of the plurality of second cuts 41 is shorter than the length of the interval of the first cuts or is connected to only one of the first cuts. Here, "staggered" refers to a state in which each of the plurality of second cuts 41 facing each other in a way displaced from each other. Therefore, when the sheet portion 33 is pulled in the vertical direction with respect to the second cut 41, the sheet portion 33 spreads into a net shape. A plurality of second cuts are connected to two sides, provided in directions intersecting the second cut, of the sheet portion. Therefore, a large part of the net-like spreading part can be formed into a more three-dimensional expanded shape, and all the second cuts can be easily expanded in a net-like manner. The third cut 43 is provided in the direction perpendicular to the first cut 35 at the edge 37 near the side, perpendicular to the first cut 35, of the oil absorbent paper 31. As shown in FIG. 11, a plurality of second cuts 41 are connected to a line segment portion sandwiched between at least two end points of one first cut 35 to form a plurality of strips 42. Cuts and strips in a reed shape are necessarily provided because a plurality of second cuts 41 are connected to a line segment portion sandwiched between two end points of one first cut 35.

The sheet portion 33 is pulled in the vertical direction with respect to the second cut 41 so that the sheet portion 33 is spread into a net shape (one example of the "net-shape making step" of the claims of the present application). Then, the absorbent sheet can be three-dimensionally expanded by grabbing and rubbing the sheet portion 33 to let the reed shape portion 39 entwine. Further, it is possible to stabilize the three-dimensionally expanded shape because at least a portion of the second cuts 41 is hooked to an arbitrary portion of the sheet portion 33 such as the first cut 35, the side of the sheet portion 33, or another second cut 41 (one example of the "three-dimensional configuration step" of the claims of the present application). In the three-dimensional configuration step, the first cut and the second cut are connected to form a plurality of strips, and therefore, three-dimensional configuration can be formed and facilitated because the second cuts are hooked to a part of the sheet part. As a result of forming a plurality of strips are formed by a plurality of first cuts 35 and a plurality of second cuts 41, the sheet portion 33 after being three-dimensionally shaped not only wraps the object from the outside but also comes into contact with the object even inside the three-dimensional shape. As a result, when the object is embedded in the expanded shape (one example of the "placing step" of the present application), the contact area with the oil absorbent paper 31 can be dramatically increased, and it is easy to remove the droplets and the liquid film attached to the surface. At the same time, the generation of a large number of strips promotes an irreversible change in the three-dimensional configuration with an increase in entropy. Therefore, it is easy to prevent the three-dimensional shape from being flattened.

Further, by inserting the edge 37 of the opposite side into the third cut 43, the object can be wrapped around without grabbing and rubbing the oil absorbent paper 31. As a result, it is easier to remove droplets or liquid films attached to the surface of the object.

Figure 12A:
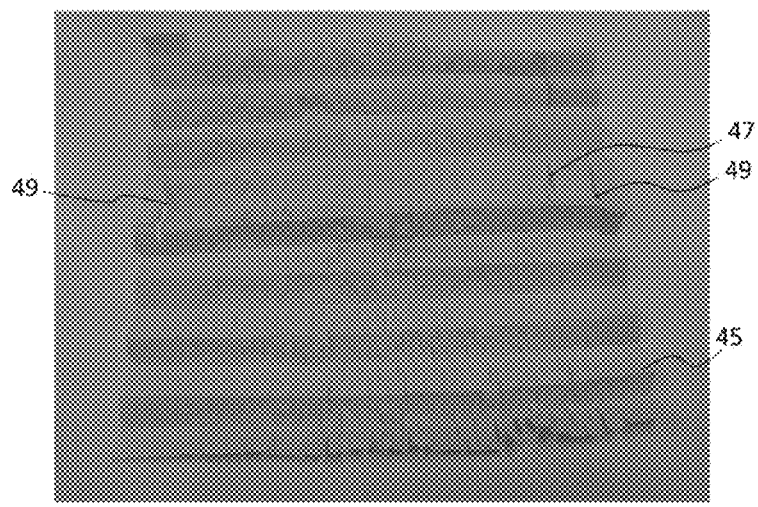
FIGS. 12A and 12B are the diagrams showing a second cut and a third cut of the oil absorbent paper.
Figure 12B:
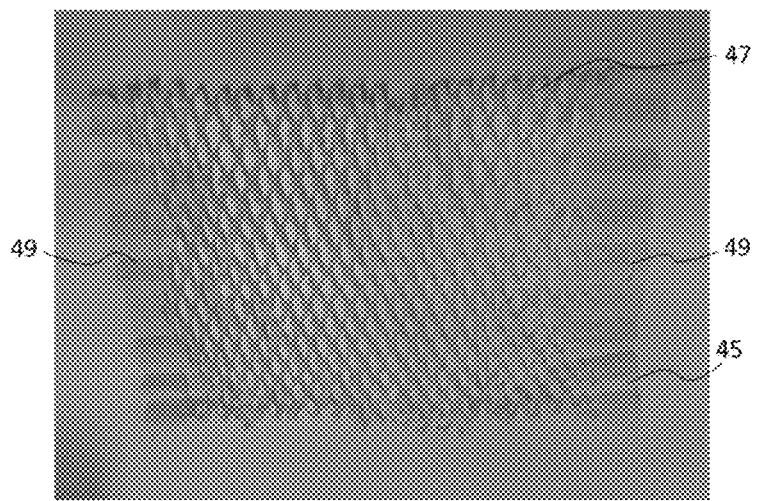

FIG. 12A-12B are the views showing a second cut 47 and a third cut 49 of the oil absorbent paper 45, and FIG. 12 is a diagram showing a state in which the first cut is not provided. As shown in FIG. 12A, the second cut line 47 is provided in a staggered manner, and the third cut line 49 is provided so as to form two opposing line segments. When the oil absorbent paper 45 is pulled in the vertical direction with respect to the second cut 47, the oil absorbent paper 45 spreads in a net-like manner as shown in FIG. 12B.

Figure 13A:
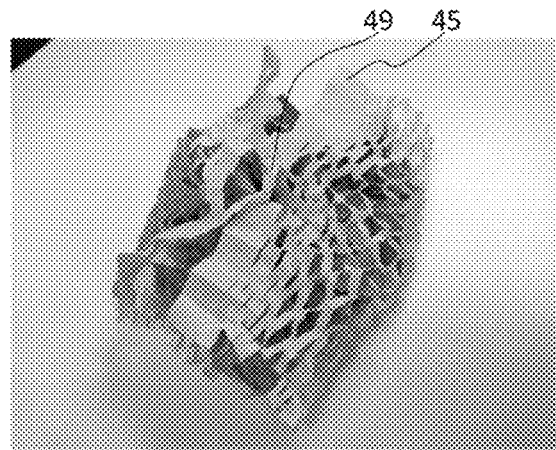
FIGS. 13A and 13B are the diagrams illustrating a state in which a triangular pyramid-shaped objects shown in FIG. 13C are wrapped with oil-absorbent paper 45.
Figure 13B:
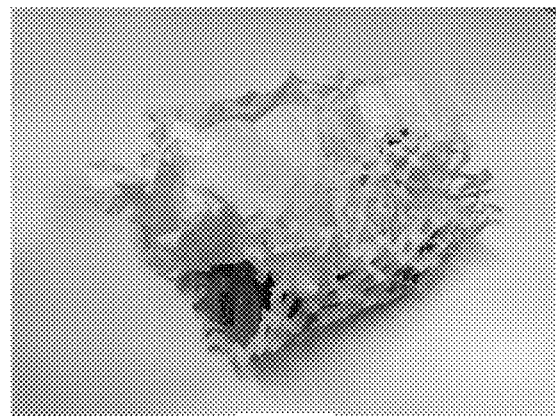
Figure 13C:
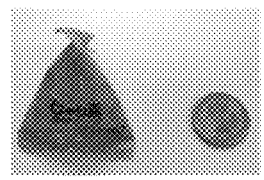

FIG. 13A-13C show a state in which triangular pyramid-shaped objects are wrapped with oil absorbent paper 45 as an example. As shown in FIG. 13A, when the two third cuts 49 are inserted into each other and fixed, 22 objects can be wrapped around by the oil absorbent paper 45. In addition, as shown in FIG. 13B, the oil absorbent paper is placed on the object, and the outside thereof is wrapped with one sheet of oil absorbent paper, so that the gap can be filled, and oil absorption can be further enhanced. FIG. 13C is a diagram showing an object used as an example.

Figure 14:
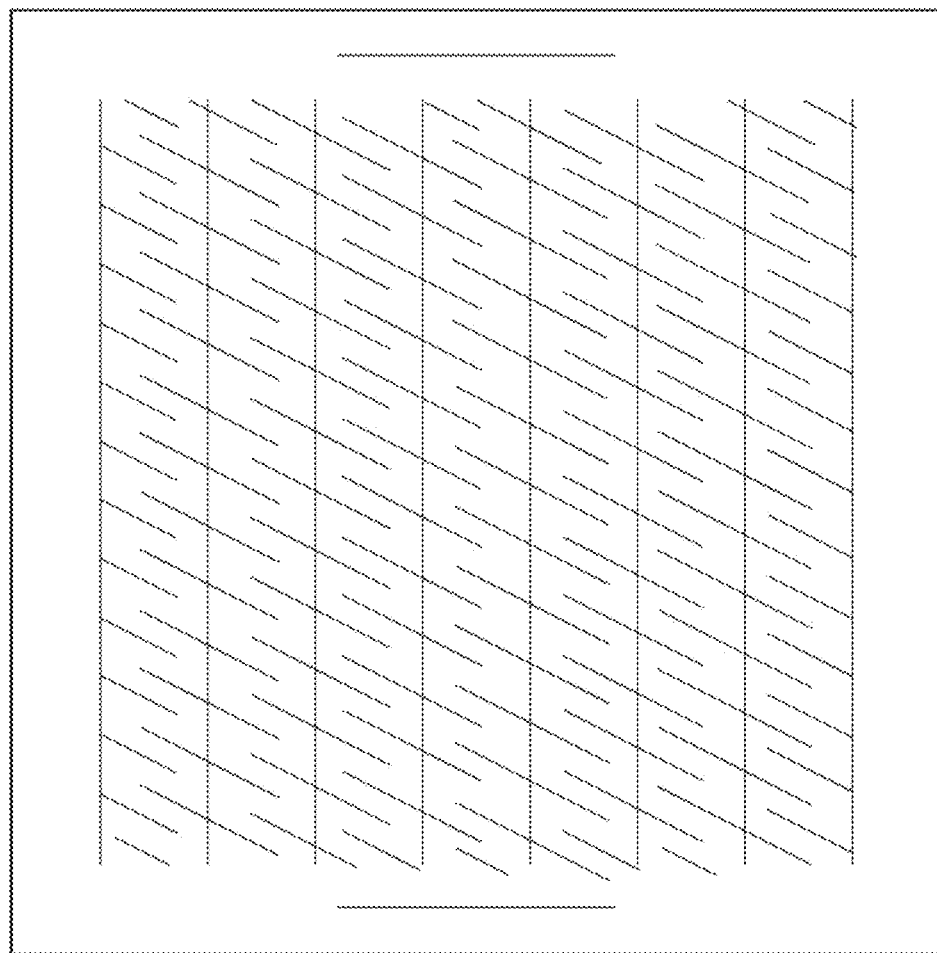
FIG. 14 is a diagram showing various examples of first cuts and second cuts of oil absorbent paper.

The pattern of the first cut, the second cut, and the third cut may be in the shape shown in (a)-(d) in FIG. 14. Also, the rear drawing (bottom view) of the cut pattern shown in FIG. 14 is symmetric with the table drawing (plan view) and not shown.

In the case where the second cut line is connected to the first cut line as shown in FIGS. 11 and 14, and when the second cut is provided so as to spread in the net shape, the second cut is easily entangled with a part of the sheet part, and the three-dimensionally expanded shape is easily maintained.

Further, the second cut is not limited in the vertical direction with respect to the first cut but may be provided obliquely to the first cut, for example, as shown in FIG. 14. In addition, as shown in FIG. 14, if the second cut is long enough to face another second cut, connected adjacent first cut, next to itself in a manner displaced from each other, the second cut is spread into a net-shape, so that the second cut is more easily entangled.

In addition, the third cut may be provided on the opposing edge portions as shown in FIG. 14 to form two opposing line segments.

Embodiment 3

Figure 15A:
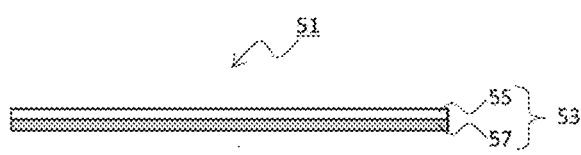
FIG. 15A-15G are the schematic diagrams showing the outline of the oil absorbent paper of embodiment 3.

FIG. 15A is a schematic diagram showing an outline of a cross section of the oil absorbent paper 51 according to the third embodiment of the present invention. The table drawing (plan view) of the oil absorbent paper 51 is similar to that of Embodiment 2.

The sheet portion 53 of the oil absorbent paper 51 is a two-layer structure of a first sheet 55 (an example of the "first sheet" of the present application) having a high absorbency and a second sheet 57 having a high rigidity (one example of the "second sheet" of the present application). The first cut, the second cut, and the third cut pass through the first sheet 55 and the second sheet 57.

The oil absorbent paper 51 has high absorbency and high rigidity without the use of special sheets with both high absorbency and high rigidity.

The first cut, the second cut, and the third cut may be provided only on either the first sheet 55 or the second sheet 57.

Figure 15E:
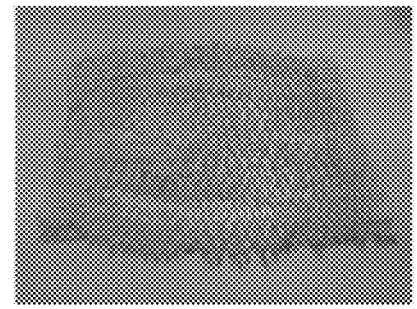
Figure 15B:
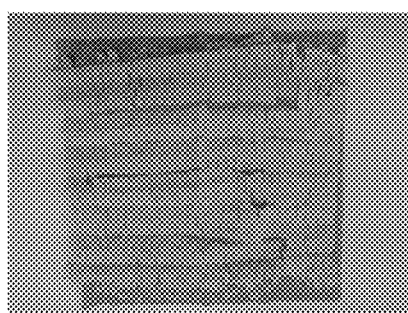
Figure 15F:
Figure 15C:
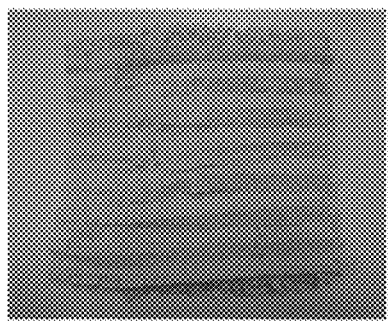
Figure 15G:
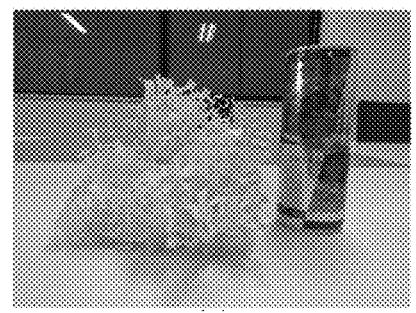
Figure 15D:
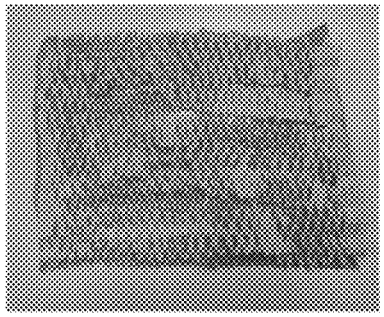

FIG. 15B is a diagram showing an oil absorbent sheet comprising a first sheet having a high white absorbing property and a second sheet having a high brown rigidity; and FIG. 15C is a diagram showing an oil absorbent sheet composed of two sheets of first sheets having high white absorbing properties. FIGS. 15D and 15E show the state in which the oil absorbent paper of 15B and 15C are pulled laterally and the second cut is spread; and 15F and 15G show the state in which the second cuts are intertwined and the oil absorbent paper is three-dimensionally expanded. When a second sheet of high rigidity is combined with the first sheet having high absorbency, the three-dimensional state in which the second cuts are entangled with each other is stabilized as shown in FIG. 15F. On the other hand, when two sheets of first sheets having high absorbency but low rigidity are used, the second cuts are entangled with each other, as shown in FIG. 15G, but partially gaps can be formed, and more likely to collapse than 15F.

Embodiment 4

Figure 16A:
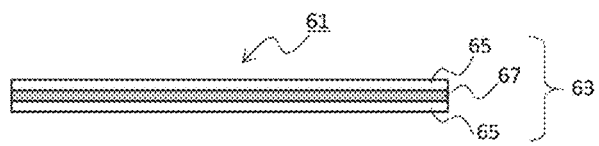
FIG. 16A-16H are the schematic diagrams showing an outline of the oil absorbent paper of embodiment 4.

FIG. 16A is a schematic diagram showing an outline of a cross section of the oil absorbent paper 61 according to the fourth embodiment of the present invention. The table drawing (plan view) of the oil absorbent paper 61 is similar to that of embodiment 2.

The sheet part 63 of the oil absorbent paper 61 is a three-layer structure laminated so as to sandwich a second sheet 67 having high rigidity by two first sheets 65 having a high sheet absorption property.

The oil absorbent paper 61 has both absorptivity and high rigidity as well as the oil absorbent paper 51 of embodiment 3. Furthermore, since the surface of the oil-absorbent paper 61 in contact with the object is always the first sheet 65 having high absorptivity, the user can use the sheet without worrying about the front and back of the absorbent sheet.

Figure 16E:
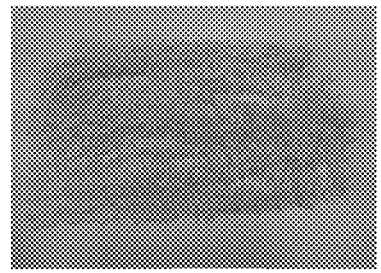
Figure 16B:
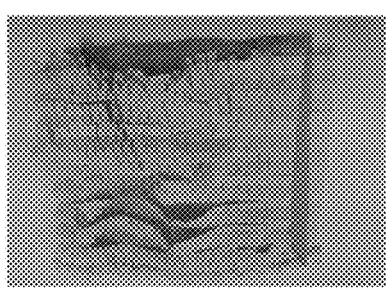
Figure 16F:
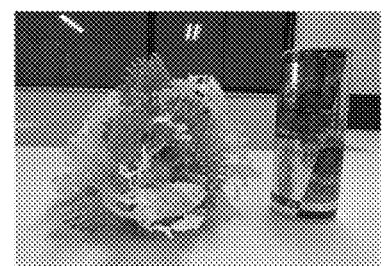
Figure 16C:
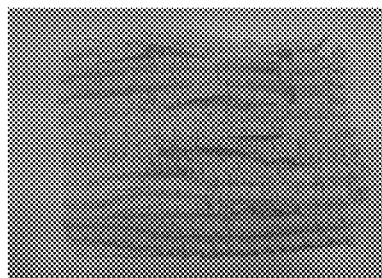
Figure 16G:
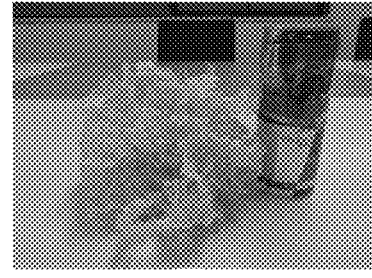
Figure 16D:
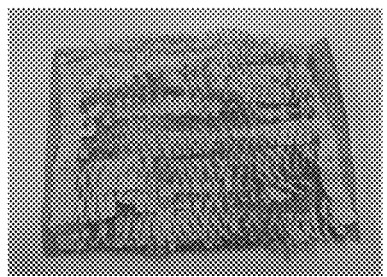
Figure 16H:
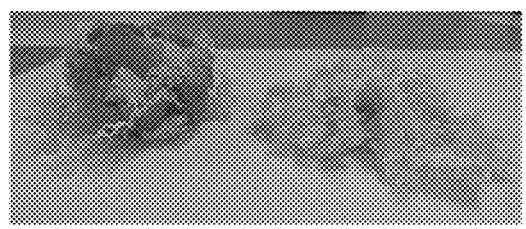
Figure 17A:
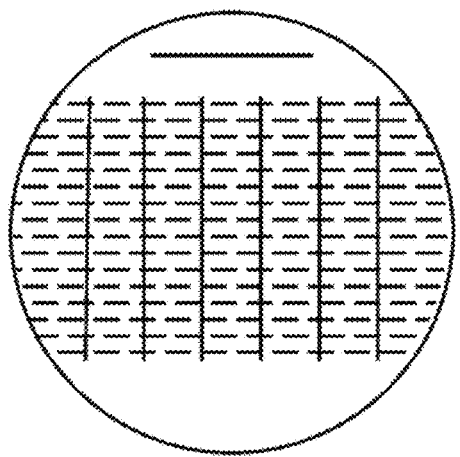
FIG. 17A-17D are the diagrams showing the variations in the shape of the absorbent sheet.
Figure 17C:
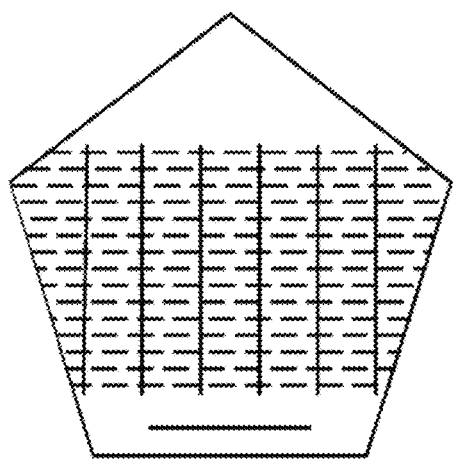
Figure 17B:
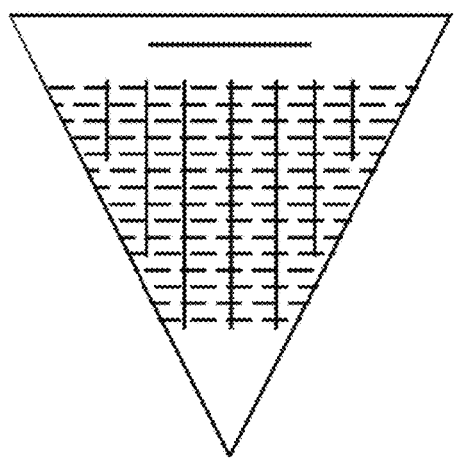
Figure 17D:
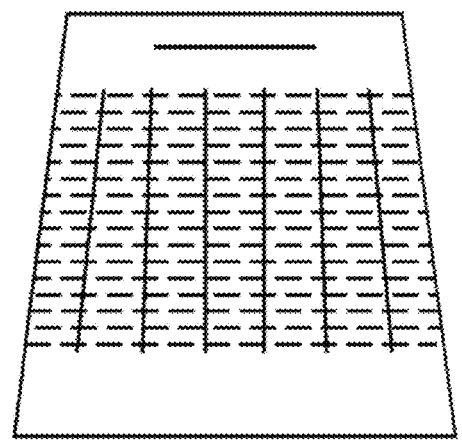

FIG. 16B is a diagram showing an oil absorbent sheet comprising a first sheet of a first sheet having a high brown rigidity between two sheets of first sheets having a high white absorbing property; and FIG. 16C is a diagram showing an oil absorbent sheet composed of three sheets of first sheets having a high white absorbing property. FIGS. 16D and 16E show a state in which the oil absorbent paper of 16B and 16C are pulled laterally and the second cut is spread, and 16F and 16G show a state in which the second cut lines are entangled with each other and the oil absorbent paper is three-dimensionally expanded. When a second sheet of high rigidity is combined with the first sheet having high absorbency, the three-dimensional state in which the second cuts are entangled with each other is stabilized as shown in FIG. 16F. On the other hand, when two sheets of first sheets having high absorbency but low rigidity are used, the second cuts are entangled with each other as shown in FIG. 16G, but the gaps are partially conspicuous. FIG. 16H shows a state after a certain vibration is applied to the oil absorbent paper in the three-dimensional state shown in 16F and 16G, and FIG. 16H shows a state after a certain vibration is applied to the oil absorbent paper in the three-dimensional state shown in 16F and 16G. 16F shows that it remains bulky even after the vibration is applied, and it is easy to stabilize the three-dimensional state.

The shape of the oil absorbing paper is not limited to a square, but may be rectangular, trapezoidal, parallelogram, other polygonal shapes, or circular or elliptical shapes or other shapes. FIG. 17A-17D are a diagram showing an example of an absorbent sheet of 17A a circular shape, 17B a triangle, 17C a pentagon and 17D a trapezoidal absorption sheet.

The first cut, the second cut, and the third cut are not limited to a simple straight line, but may be linear other than a straight line such as a curve, a wavy line or a zigzag line.

Further, the second cut may be weakly connected so as to form a perforation, for example, a perforation or the like so as to form a cut line when the user spreads into a net-shape.

The third cut may be provided on the oil absorbent paper as described in embodiment 2. For example, the third cut may be provided one by one so as to face each other across the strip.

1; Oil Absorbent Paper, 3; Sheet Portion, 5; Cut, 7; Edge Portion, 9; Reed Shape Portion, 11; the three-dimensional shape of FIG. 5A viewed from the top, 13; the three-dimensional shape of FIG. 5B viewed from the top, 15; the three-dimensional shape of FIG. 5C viewed from the top, 17; the three-dimensional shape of FIG. 5A viewed from the side, 19; the three-dimensional shape of FIG. 5B viewed from the side, 21; the three-dimensional shape of FIG. 5C viewed from the side, 31; Oil Absorbent Paper, 33; Sheet Section 35; First Cut, 37; Edge Portion, 39; Reed Shape Portion, 40; End Collection Portion, 41; Second Cut 42; Strip, 43; Third Cut, 44; End Point, 45; Oil Absorbent Paper, 47; Second Cut, 49; Third Cut, 50; First Cut, 51; Oil Absorbent Paper, 53; Sheet Portion, 55; First Sheet, 57; Second Cut, 61; Oil Absorbent Paper, 63; Sheet Portion, 65; First Sheet, 67; Second Sheet.

The invention claimed is:

1. An absorbent sheet for removing a droplet or a liquid film attached to a surface of an object, comprising:
   a sheet portion in sheet form;
   a plurality of first cuts provided in the sheet portion;
   a plurality of second cuts shorter than the first cuts provided in a direction intersecting the first cuts;
   an edge portion provided near an edge of the sheet portion, in which the first cuts are not provided; and
   a reed shape portion having a plurality of loose end aggregation portions, the portion which is an area sandwiched between a couple of the first cuts in line segment-like cut in a direction normal toward the edge portion, leaving the edge portion uncut;
   wherein the plurality of loose end aggregation portions are connected at a plurality of the edge portions which face each other across the reed shape portion;
   wherein the plurality of the second cuts are provided between the first cuts; and
   wherein a plurality of loose ends are formed by connection of a plurality of the second cuts with a line segment portion between two edge points of the first cut.

2. The absorbent sheet according to claim 1, wherein the plurality of the second cuts are arranged in a staggered manner, so that the sheet portion spreads in a net-shape when the sheet portion is pulled in a direction perpendicular to the second cuts.

3. The absorbent sheet according to claim 2, wherein the plurality of the second cuts reach a side of the sheet portion in a direction intersecting the second cuts.

4. The absorbent sheet according to claim 1, further comprising a third cut provided in the edge portion in a direction intersecting the first cuts.

5. The absorbent sheet according to claim 1,
   wherein the sheet portion has a plurality of sheets, that is, a first sheet and a second sheet with more rigidity than that of the first sheet,
   wherein the first sheet has higher absorbency than the second sheet; and
   wherein at least a portion of the first cuts or the second cuts penetrate the first sheet and the second sheet.

6. The absorbent sheet according to claim 5, wherein a plurality of the first sheets are stacked so as to sandwich the second sheet.

7. The absorbent sheet according to claim 1, wherein a shape of the sheet portion is square, rectangular, trapezoidal, parallelogram, or other polygonal shape, or circular or elliptical shape.

8. An absorbent sheet roll comprising a plurality of the absorbent sheet, according to claim 1, connected via a cutting line.

* * * * *